Patented Mar. 11, 1947

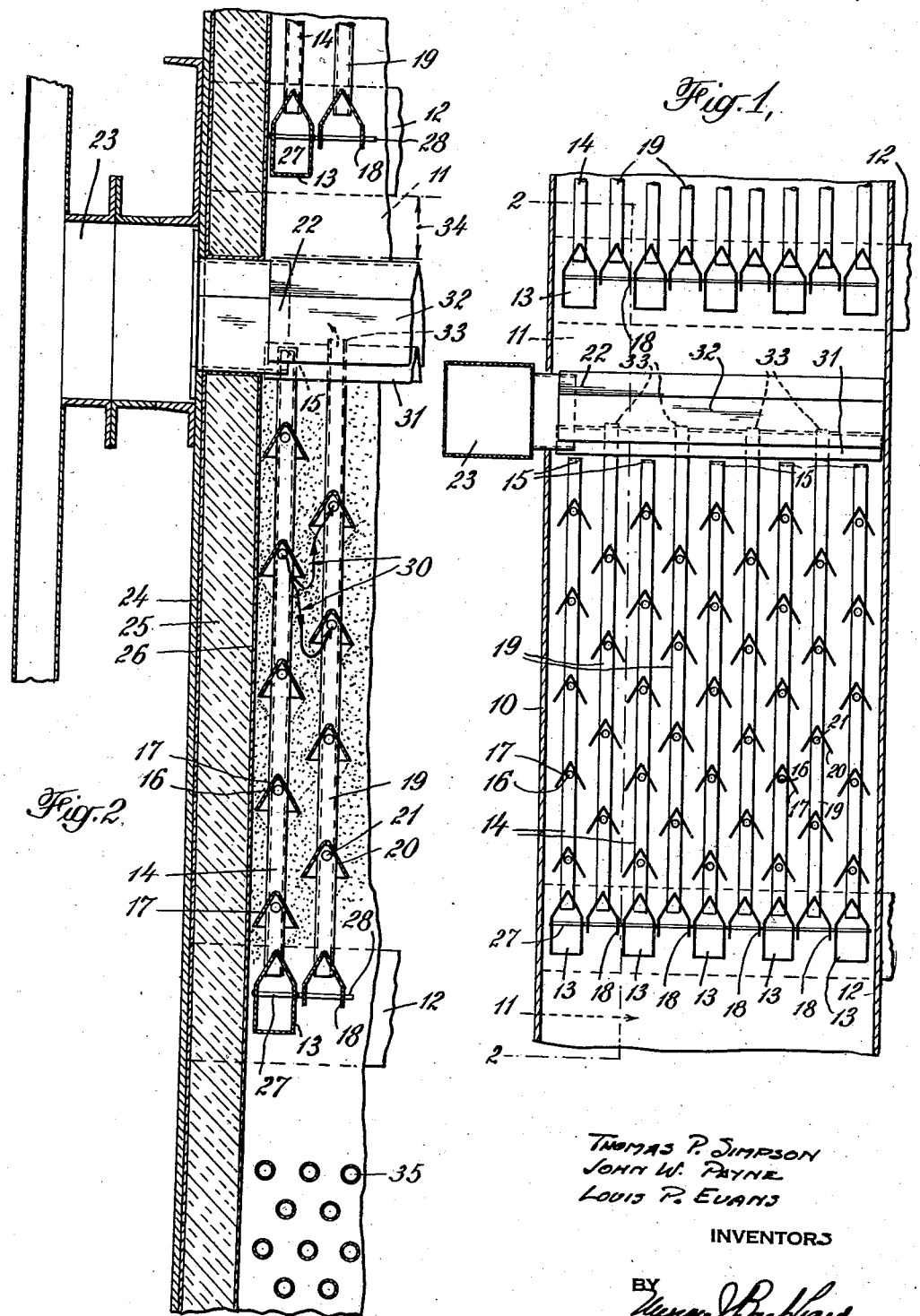

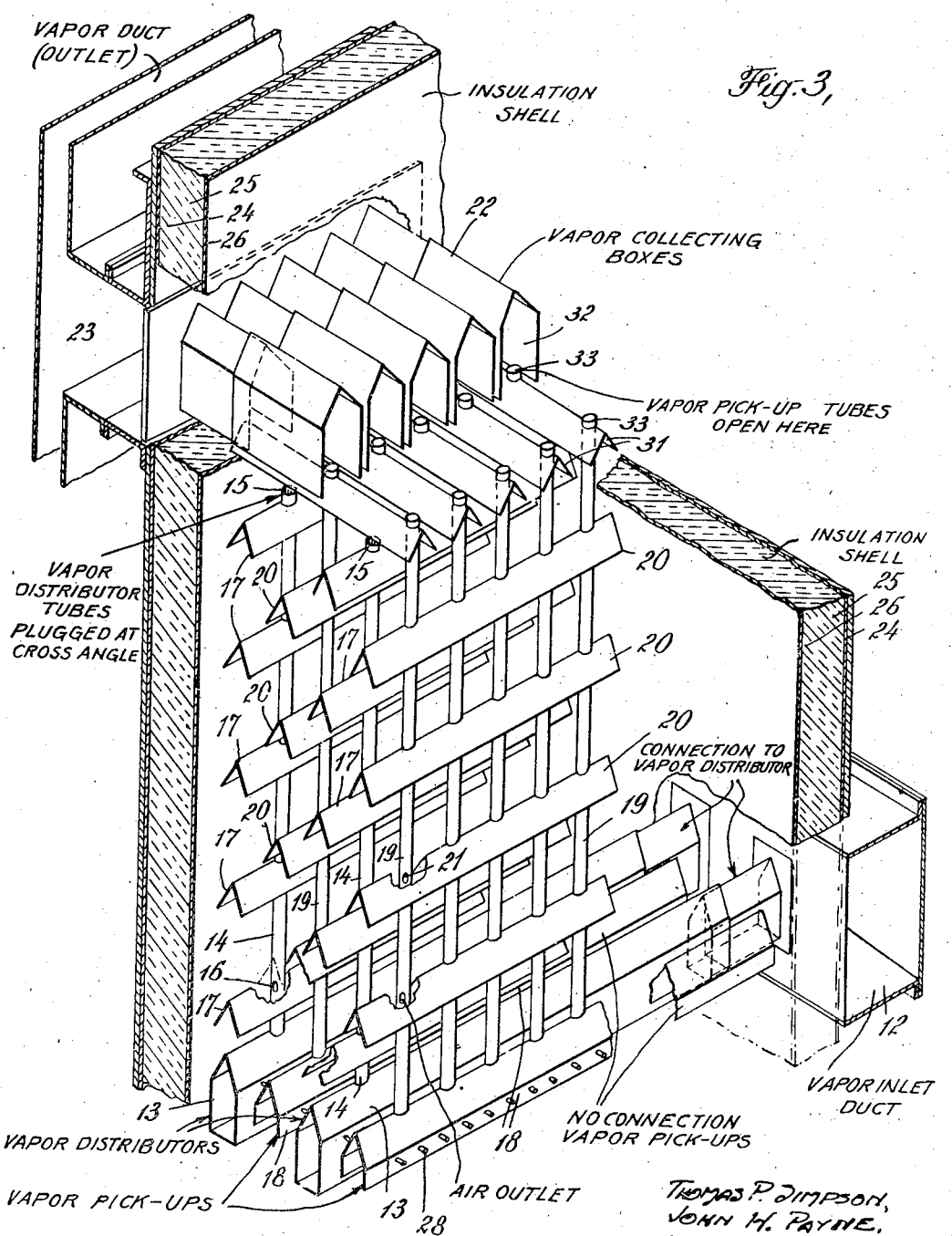

2,417,399

UNITED STATES PATENT OFFICE 2,417,399

APPARATUS FOR REACTIONS IN A CONTACT MASS

Thomas P. Simpson, John W. Payne, and Louis P. Evans, Woodbury, N. J., assignors to Socony-Vacuum Oil Company, Incorporated, a corporation of New York Application June 17, 1942, Serial No. 447,432

5 Claims. (Cl. 23—288)

This invention has to do with a method and apparatus for carrying out reactions involving a contact mass of granular or particle form and vaporous reactants. It is particularly concerned with apparatus of this general nature wherein the contact mass flows either continuously or semi-continuously through the reaction zone. This apparatus is applicable to any conversion of this general type and is specifically applicable to such operations as the vapor phase conversion of high boiling point petroleum hydrocarbons to lower boiling point hydrocarbons, to vapor phase oxidation of organic compounds, to polymerization of vaporous compositions and in general to any reaction which may be carried out by contacting of a reactant material in vapor phase with a catalytic material which may take the form of a contact mass material or which may be deposited within or upon such a contact mass material. Since many such reactions require regeneration of the contact mass used and since such regeneration usually likewise takes the form of a contact of gaseous or vaporous reactant with a contact mass, the apparatus and method is also capable of being utilized for such regenerations. As a specific example of a conversion which may be accomplished, there may be cited the above mentioned conversion of high boiling point petroleum fractions to gasoline. Such conversions are usually carried out in the presence of an adsorbent refractory contact mass consisting of associated alumina and silica in granular or pellet form. Such contact masses are frequently referred to as clays. As a specific example of regeneration reactions, there may be mentioned the regeneration of the above contact mass by reacting it with air or oxygen containing gas to remove from it combustible carbonaceous deposits laid down during the conversion.

Proper utilization of contact masses in such processes requires a rather complete diffusion of vaporous reactants into the contact mass. It also requires the capability of passing comparatively large volumes of gaseous reactants through the apparatus without undue pressure drop. In former designs, it usually has been found necessary to sacrifice one of these desirable features to some extent in favor of the other. For example, in a process wherein the reactants are passed through a relatively deep bed of contact mass, limited space velocities of reactant were necessary both to avoid undue pressure drop and to avoid space velocities at which the carrying effect of a reactant would be such as to bring about "boiling" of the contact mass with consequent channeling and ineffective utilization. When some form of structure was utilized which presented a sufficient amount of voids distributed throughout the contact mass to avoid undue pressure drops it became difficult to secure good diffusion of reactants into the contact mass.

This invention has for its principal object the provision of apparatus wherein vaporous reactants may be contacted with a moving solid column of contact mass material in such manner as to insure complete and controlled diffusion of such reactant through such contact mass material, while at the same time capable of attaining relatively high rates of reactant throughput coupled with relatively low overall pressure drops.

This object and other objects, as will be pointed out hereinafter, have been obtained by the development of an apparatus which may be more readily understood by referring to the several drawings attached to this specification, in which drawings Figure 1 is a highly diagrammatic representation of the apparatus. Figure 2 is a detailed showing of a portion of the apparatus and Figure 3 is an isometric drawing showing in general the arrangements of the apparatus by setting forth in picture form certain portions thereof.

Referring now to Figure 1, this figure represents in diagram form an apparatus according to this invention for the contacting of gasi-form reactants with a flowing solid column of granular or particle form refractory contact mass. In this drawing 10 represents the casing or shell of the reactor and the portion between the two lines 11 represents one section thereof. A reactor dependent upon conditions and capacities to be met may consist of one or more sections similar to that between the lines 11; only one such section will be explained in detail. At the bottom of this section gasi-form reactants are introduced through pipe 12, are led from pipe 12 into vapor distributor boxes 13, pass upwardly from vapor distributor boxes 13 into vapor distributor tubes 14 which are closed at their tops as at 15, pass from tubes 14 through orifices 16 and are distributed into the contact mass through distributor channels 17. Between vapor distributor boxes 13 at the bottom there are found vapor pick-up boxes 18, from each of which there extends upwardly vapor pick-up tubes 19, each provided with a plurality of collector channels 20 and access orifices 21. Vapor having passed through contact mass collects under collectors 20, passes through orifices 21 into tubes 19 and passes upwardly through tubes 19 into vapor collector boxes 22 and from thence into vapor outlet duct 23. Solid contact mass material flowing down through reactor shell completely fills the space between and around the distributor tubes 14 and the collector tubes 19 in a manner hereinafter described, except for spaces under the distributor channels 17 and the collector channels 20.

Turning to Figure 2, there is shown here a large scale detail of that portion of Figure 1 indicated by the dotted line 2—2, namely, covering that pair of distributor and collector tubes at the left hand side of Figure 1. In Figure 2, we find the reactor shell 10 to be composed of an outer casing plate 24, a thickness of insulation 25 and an inner plate 26. At the bottom of the section shown, we find one vapor distributor box 13. This box, made of thin sheet metal, has the form of a gable roofed box. It is open at its end into a vapor inlet duct running behind the reactor shell in a position indicated by the dotted lines 12. Upwardly from vapor distributor box 13, there runs vapor distributor tube 14, regularly spaced along this vapor distributor tube 14, supported thereby and at right angles thereto, there is a series of vapor distributor channels 17 and under each channel there is an orifice 16 in tube 14. The upper ends of these tubes 14 are plugged at 15. Alternately with vapor distributor boxes 13 are mounted vapor pick-up channels 18, one of which is shown. Upwardly from box 18, there extends vapor collector tubes 19, which tubes 19 are equipped at spaced intervals with vapor collector channels 20, under each of which there is an orifice 21. Vapor collector tubes 19 are open at their upper ends into vapor collector box 22, which vapor collector box leads to vapor outlet 23. The space around and between vapor distributor tubes 14 and vapor collector tubes 19 is filled with downwardly flowing contact mass in the form of a descending column solidly extending throughout free space in the reactor except for those spaces under the distributor channels 17 and the collector channels 20. The column of solid material in its downward flow is influenced by the construction afforded by the alternate boxes 13 and 18 at the bottom of the section which together extend entirely across the reactor in the form of a grid or grate and leave between them passages 27 down which the contact mass material may flow. As will be seen from consideration of Figures 1 and 2 together, the form and placing of these boxes at the bottom of the section is such that they tend to exert a distributing action. Turning specifically to vapor collector channel 18, this channel is not connected to any external duct except by tubes 19 and its volume and shape are those determined by its function as a companion in the distributor group arrangement with the box 13. Box 13 is provided internally with a stiffener 27, and channel 18 is equipped with stiffener 28, which extends externally as a spacer to maintain slots 29. The flow of reactants is clearly shown by dotted arrows at 30. Passing upwardly through a distributor tube 14, reactant vapor will pass outwardly through an orifice therein, distribute under the distributor channel thereover and will pass under this distributor channel into the adjacent solid moving column of contact mass. A portion will move upwardly, be caught under the collector channel next upwardly adjacent, pass from thence into a collector tube 19 and pass vertically upward through that collector tube. Another portion will pass downwardly and similarly find its way into a collector tube through the collector channel next adjacent downwardly. Arrangements at the top of the section will be most clearly visualized by reference to Figure 3, wherein like parts are given the same numerals as in Figures 1 and 2 and the type of view is such as to clearly set forth in a three dimensional way, the relation of the several parts of the apparatus. At the top of this view vapor collector boxes 22 are seen to be composed each of a channel member 31 into which all of the tubes, both the distributor tubes 14 and the collector tubes 19 are led, the distributor tubes being plugged however at this end, and of a hood member 32 which cooperates with channel 31 to form vapor collector boxes 22. A slot 33 provided on each side between channel member 31 and the hood member 32 serves to remove adventitious solid material from collector box 22. Collector boxes 22 are mounted at right angles to the distributor boxes 13 and pick-up angles to the distributor boxes 13 and pick-up boxes 18. Collector boxes 22 are of gable roofed shape and serve both to distribute downwardly flowing contact mass across the reactor section and to hold it back, this damming action at this level providing a length of rather solidly packed contact mass below the distributor boxes next above, as may be seen by noting the dotted lines 34 in Figure 2 which define this relatively solid bed. This relatively solid bed serves to isolate one section from another in a multi-section reactor. It will also be quite evident from consideration of Figure 3, how channels 13 and boxes 18 cooperate to form a distributing means for contact mass at the bottom of the section, as well as to visualize how the superimposition of a row of such boxes above a row of vapor collector boxes 22 will serve to secure adequate distribution of contact mass in a multi-section reactor.

In some cases the heat control of the reaction being carried on within the reactor may be desired. In such cases since we have a moving column of contact mass material, it is quite convenient to effect such heat control by adjusting the temperature of the contact mass between sections in a multi-section reactor or at the inlet end of a single section reactor. With the construction herein shown, this is quite readily effected by inserting heat transfer tubes in the reactor in such position that the moving column of contact mass passes across them. They will normally be installed between vapor collector boxes 22 and the bank of distributor boxes 13 and pick-up channels 18 immediately above. In Figure 2 such a cooler, for a multi-section reactor, is shown by tubes 35. It will, of course, be understood that in this position it is assumed that Figure 2 shows a portion of a multi-section reactor. It is obvious that if Figure 2 were directed only to a single section reactor in which control of contact mass temperature was desired prior to entry of a reaction section, that tubes such as 35 could be mounted similarly upwardly of vapor collector boxes 22.

This design of reactor has certain very definite advantages in connection with reactions between vaporous or gaseous reactants and solid contact mass material in pellet or particle form. Returning to the arrows 30 in Figure 2, we find that in its passage from a distributor tube to a collector tube, the reactant must pass through a solid bed or contact mass material. This passage results in an intimate diffusion of the reactant throughout the contact mass material. On the other hand, we find that the average depth of contact mass material through which the reactant must pass is only of the depth of contact mass material between a distributor trough and the next adjacent collector trough, that is to say, in an apparatus where the troughs have a 12" spacing, the average depth of contact mass through which reactants must pass is around 6" or so. Consequently, very considerable volumes of reactants with respect to volume of contact mass may be handled at relatively low pressure drops while securing a forced complete diffusion of the reactant through a solid bed of contact mass. Similarly since the descending contact mass tends to be redistributed continuously by flowing around the distributor and collector troughs and is continuously resubjected to reactants, there is achieved a very complete utilization of contact mass which would not normally be possible in relatively quiescent beds of contact mass having no greater depth than the dimensions suggested herein when subjected to the same high space velocities of reactants.

We claim:

1. In a contacting apparatus, means defining a substantially vertical chamber, a plurality of inlet deflectors arranged in a plurality of vertical series in said chamber, a plurality of outlet deflectors arranged in a series parallel to and between each two series of inlet deflectors, each of said deflectors comprising means defining an inverted trough, a plurality of vertical inlet tubes passing through each deflector of each series of inlet deflectors, a plurality of vertical outlet tubes passing through each deflector of each series of outlet deflectors, each of said tubes being perforated to provide communication between the interior thereof and the space below each deflector through which it passes, duct means to admit fluid to each of said inlet tubes and duct means to withdraw fluid from each of said outlet tubes.

2. In a contacting apparatus, means defining a substantially vertical chamber, a plurality of inlet deflectors arranged in a plurality of vertical series in said chamber, a plurality of outlet deflectors arranged in a series parallel to and between each two series of inlet deflectors, each of said deflectors comprising means defining an inverted trough, a plurality of vertical inlet tubes passing through each deflector of each series of inlet deflectors, a plurality of vertical outlet tubes passing through each deflector of each series of outlet deflectors, each of said tubes being perforated to provide communication between the interior thereof and the space below each deflector through which it passes, duct means to admit fluid to each of said inlet tubes and duct means to withdraw fluid from each of said outlet tubes, one of said duct means comprising a plurality of parallel horizontal ducts each having an upwardly extending angular roof section whereby the horizontal ducts are adapted to distribute solid particles passing therebetween.

3. In a contacting apparatus, means defining a substantially vertical chamber, a plurality of inlet deflectors arranged in a plurality of vertical series in said chamber, a plurality of outlet deflectors arranged in a series parallel to and between each two series of inlet deflectors, each of said deflectors comprising means defining an inverted trough, a plurality of vertical inlet tubes passing through each deflector of each series of inlet deflectors, a plurality of vertical outlet tubes passing through each deflector of each series of outlet deflectors, each of said tubes being perforated to provide communication between the interior thereof and the space below each deflector through which it passes, each of said outlet deflectors being disposed on a horizontal level intermediate the horizontal levels of adjacent inlet deflectors of an adjacent series of inlet deflectors, duct means to admit fluid to each of said inlet tubes and duct means to withdraw fluid from each of said outlet tubes.

4. In a contacting apparatus, means defining a substantially vertical elongated chamber, a plurality of vertically spaced groups of deflectors, each deflector comprising means defining an inverted trough, said deflectors in each group being arranged in a plurality of substantially parallel vertically extending series placed side by side across said chamber, for each group a plurality of vertical inlet tubes passing through each deflector of alternate vertical series, a plurality of vertical outlet tubes passing through each deflector of each series of outlet deflectors, each of said tubes being perforated to provide communication between the interior thereof and the space below each deflector through which it passes, duct means to admit fluid to each of said inlet tubes and duct means to withdraw fluid from each of said outlet tubes.

5. In a gas-solid contacting apparatus, means defining a substantially vertical elongated chamber, a plurality of vertically spaced groups of substantially horizontal deflectors within said chamber, each deflector comprising means defining an inverted trough, said deflectors in each group being arranged in a plurality of substantially parallel vertically extending series placed side by side across said chamber, each of said deflectors being disposed on a horizontal level intermediate the horizontal level of adjacent deflectors of an adjacent series of deflectors, said groups of deflectors being spaced vertically apart a substantially greater vertical distance than the vertical distance between adjacent deflectors in adjacent vertical series thereof, for each group of deflectors a plurality of vertical inlet tubes passing through each deflector of each series of alternate vertical series and communicating with the space below the deflectors through which they pass, a plurality of vertical outlet tubes passing through each deflector of each other vertical series and communicating with the space below the deflectors through which they pass, separate means to introduce inlet gas to said inlet tubes in each group and separate means to withdraw gas from said outlet tubes in each group.

THOMAS P. SIMPSON.
JOHN W. PAYNE.
LOUIS P. EVANS.

REFERENCES CITED

The following references are of record in the file of this patent:

UNITED STATES PATENTS

| Number | Name | Date |
| --- | --- | --- |
| 1,852,227 | Barstow et al. | Apr. 5, 1932 |
| 1,685,338 | Randolph | Sept. 25, 1928 |
| 1,784,626 | Hamill et al. | Dec. 9, 1930 |
| 698,129 | Niese | Apr. 22, 1902 |
| 908,831 | Bailey | Jan. 5, 1909 |